Aug. 20, 1957  M. L. LEHV  2,803,164
PROJECTION STRIP EASEL
Filed May 9, 1955
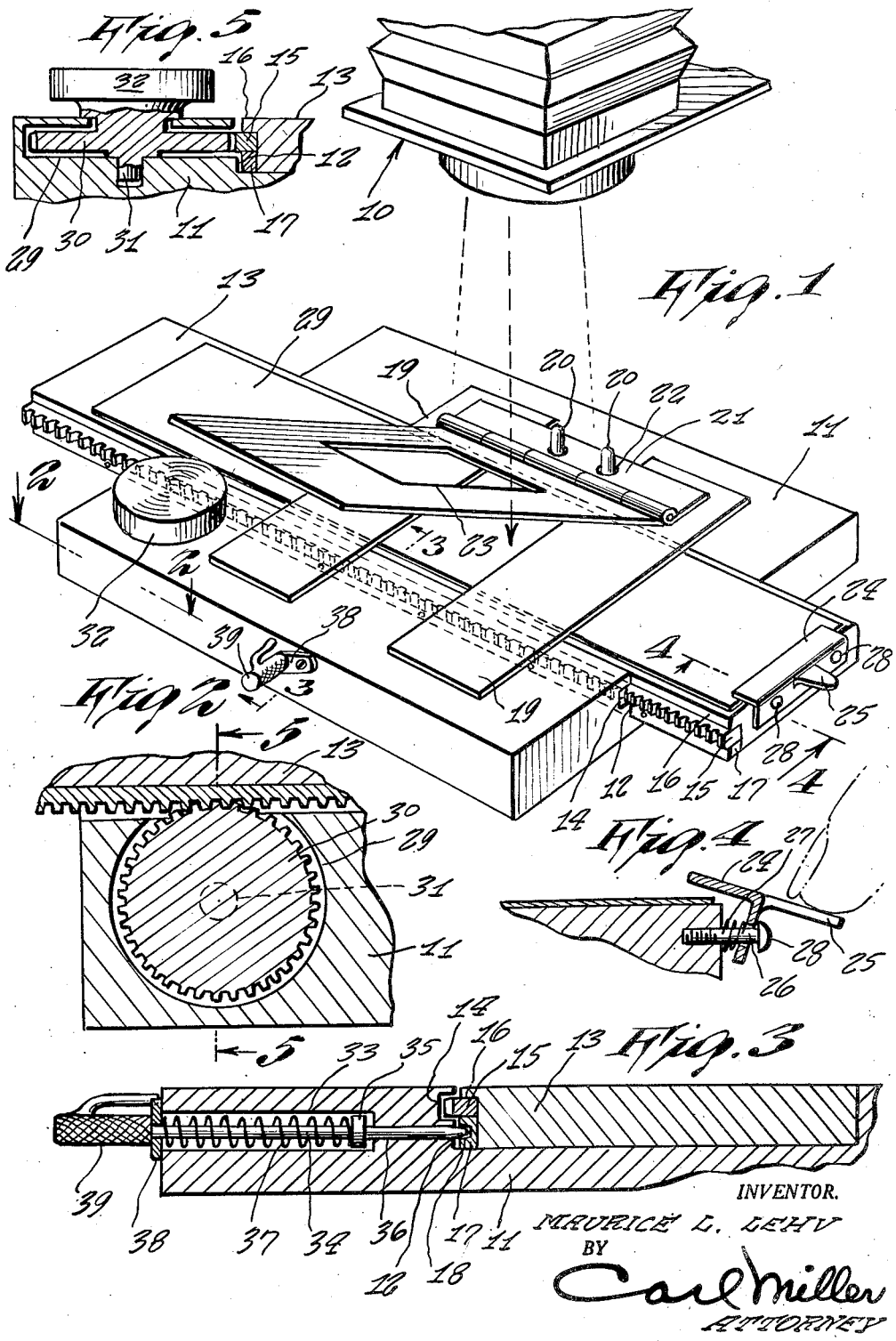
INVENTOR.
MAURICE L. LEHV
BY
Carl Miller
ATTORNEY

2,803,164
PROJECTION STRIP EASEL

Maurice L. Lehv, Brooklyn, N. Y.

Application May 9, 1955, Serial No. 506,712

1 Claim. (Cl. 88—24)

This invention relates to projection strip easels.

It is an object of the present invention to provide a projection strip easel wherein the position of the photo-sensitive printing paper is automatically and mechanically determined with accuracy and ease to position the same below the enlarging camera in the absence of light.

It is another object of the present invention to provide a projection strip easel of the above type wherein the photo sensitive printing strip is automatically stopped at the proper point below the enlarging camera during the printing of a plurality of images on the strip, this positioning being automatic and accurate.

It is still another object of the present invention to provide a projection strip easel of the above type wherein the window above the strip may be easily and readily replaced by other different sized window openings with a minimum of time and effort.

For other objects and a better understanding of the invention, reference may be had to the following detailed description taken in connection with the accompanying drawing, in which:

Figure 1 is a perspective view of a preferred embodiment of the present invention;

Fig. 2 is a horizontal sectional view thereof taken along the line 2—2 of Fig. 1;

Fig. 3 is a fragmentary vertical sectional view taken along the line 3—3 of Fig. 1;

Fig. 4 is a fragmentary vertical sectional view taken along the line 4—4 of Fig. 1; and Fig. 5 is a vertical sectional view taken along the line 5—5 of Fig. 2.

Referring now more in the detail to the drawing, 10 indicates generally an enlarging camera of any suitable construction which is positioned above the baseboard 11, substantially as illustrated.

In the practice of my invention, the baseboard 11 is provided with a central longitudinally extending groove 12 on its upper surface within which is positioned a slide 13, the upper surface of the slide 13 lying in the same plane as the upper surface of the baseboard 11. The front side of the groove 12 (Fig. 3) is provided with a second groove 14 which slidably surrounds a rack gear 15 positioned below the overhanging ledge 16 provided in the slide 13, a retaining strip 17 being positioned below the rack gear and supporting the same. The retaining strip 17 at longitudinally spaced intervals is provided with the recesses 18 for a purpose which will hereinafter become clear. Thus, upon sliding movement of the slide 13 through the groove 12, the rack gear 15 will be slidably received within the secondary groove 14.

A pair of strips 19 longitudinally spaced are secured across the upper surface of the baseboard 11, retaining the slide 13 within the groove 12, as will be obvious. A pair of studs 20 extend upwardly intermediate the strips 19 from the baseboard 11 and releasably position thereon a hinge 21 by means of the longitudinally spaced openings 22 provided therein, one of the hinge plates with the hinge 21 being elongated and having a window opening 23 adapted to be aligned with the enlarging camera 10.

An L-shaped bracket 24 integrally formed with a tab 25 is pivotally mounted upon a pair of bolts 26 screw threaded into the end of the slide 13, a coil spring 27 being provided on each of the bolts 26 intermediate the heads 28 thereof and the end of the slide whereby to normally retain the L-shaped bracket 24 in the clamping position of Fig. 1, while at the same time permitting its release upon depression of the tab 25, as shown in Fig. 4. A photo-sensitive printing strip 29 is positioned on the top of the slide 13 below the strips 19, one end thereof being engaged by the clamp 24 whereby upon movement of the slide 13, the strip 29 will move therealong.

As a means of effecting desired movement of the slide 13 in strip 29 in the dark room, the baseboard 11 at one end is provided with a hollow cylindrical compartment 29' within which is rotatably mounted the gear 30 in mesh with the rack gear 15, the gear 30 being integrally formed with the shaft 31 which is mounted in the baseboard and the enlarged knob 32 whereby the gear may be operated. Thus, by rotation of the knob 32 in either direction, the slide will be moved in the corresponding direction.

As a means of automatically stopping the slide for each print on the strip, the front of the baseboard is provided with a cylindrical opening 33 which slidably receives therewithin the rod 34 integrally formed with the shoulder 35 which abuts one end of the bore 33, the rod 34 extending through the baseboard in the reduced bore 36 and being adapted to bear on the recesses 18 of the supporting strip 17. The shoulder 35 and rod 34 are normally urged inwardly by a coil spring 37 which sleeves the rod intermediate the shoulder 35 and a collar 38 which abuts the front of the baseboard (Fig. 3), an externally knurled operating handle 39 being provided. Thus, as the slide moves along under the action of knob 32, the rod 34 will engage the recesses 18 to automatically stop the same and prevent its further movement. However, upon withdrawing the handle 39 against the action of the spring 37, the next movement will be permitted and upon release of the handle 39, this next movement will automatically stop at the correct position.

While various changes may be made in the detail construction, it shall be understood that such changes shall be within the spirit and scope of the present invention as defined by the appended claim.

Having thus set forth and disclosed the nature of my invention, what is claimed is:

A projection strip easel comprising a baseboard, a slide movable across the said baseboard in a recess provided therein, means for retaining said slide within said recessed portion, means for securing one end of a photo sensitive strip on the upper surface of said slide, means for moving said slide longitudinally within said recessed portion, and releasable means for automatically stopping said slide and strip after a predetermined movement, said means for moving said slide comprising said recessed portion of said baseboard at one side having a secondary longitudinal groove, a rack gear at one side of said slide received within said secondary groove, said baseboard having a hollow cylindrical compartment communicating with said secondary groove, a gear rotatably mounted within said compartment in mesh with said rack gear, an enlarged knob on the upper surface of said baseboard for turning said gear, said means for automatically stopping said slide comprising said baseboard having a cylindrical bore extending inwardly, a rod slidable within said bore, said baseboard having a reduced bore receiving said rod therethrough beyond said first bore and communicating with said recessed portion, said slide at one side below said rack gear having longitudinally spaced recesses adapted to receive the end of said rod therewithin, a collar on said rod within said first bore, a coil spring sleeving said rod intermediate said collar and the outer end of said rod whereby to normally retain said rod within said recesses, an external handle for withdrawing said rod against the action of said coil spring, said retaining means comprising a pair of retainer strips secured across the upper surface of said mounting board and longitudinally spaced therefrom, a pair of studs extending upwardly from said board intermediate said strips at one side of said slide, a movable hinge having longitudinally spaced openings receiving said studs upwardly therethrough, one plate of said hinge being elongated and adapted to overlie said strips and having a central window exposing said photographic printing strip, said means for retaining said photo-sensitive strip on said slide comprising an L-shaped bracket at one end of said slide, a pair of laterally spaced bolts secured to the ends of said slide, said bracket having mounting openings receiving said bolts therethrough, the heads of said bolts extending outwardly beyond the end of said slide whereby to permit rotational movement of said L-shaped bracket, coil springs sleeving the bolts inwardly of said bracket and adapted to retain the upper horizontal portion thereof in engagement with the upper surface of the slide with the strip end therebetween, said L-shaped bracket being integrally formed with the tab to facilitate the rotational movement thereof away from said slide.

References Cited in the file of this patent

UNITED STATES PATENTS

| | | |
|---|---|---|
| 2,167,298 | Hardy | July 25, 1939 |
| 2,212,834 | Kalish | Aug. 27, 1940 |
| 2,263,025 | Young | Nov. 18, 1941 |
| 2,601,051 | Nielsen | June 17, 1952 |
| 2,686,050 | Zelar | Aug. 10, 1954 |